United States Patent [19]

Fluker et al.

[11] Patent Number: 5,436,908
[45] Date of Patent: Jul. 25, 1995

[54] COMMON EDGE OUTPUT SKEW DETECTION CIRCUIT

[75] Inventors: Jon L. Fluker, Scarborough; Ray A. Mentzer, Portland, both of Me.

[73] Assignee: National Semiconductor Corporation, Santa Clara, Calif.

[21] Appl. No.: 899,740

[22] Filed: Jun. 17, 1992

[51] Int. Cl.[6] .............................................. G06K 9/28
[52] U.S. Cl. ........................................ 371/1; 371/25.1; 371/28; 364/569; 364/579; 364/580
[58] Field of Search ................... 371/1, 27, 25.1, 28; 364/569, 488, 579, 580, 721; 324/158 R

[56] References Cited

U.S. PATENT DOCUMENTS

| | | | |
|---|---|---|---|
| 4,646,297 | 2/1987 | Palmquist et al. | 371/1 |
| 4,700,347 | 10/1987 | Rettberg et al. | 371/1 |
| 5,003,256 | 3/1991 | Merrill | 371/1 X |
| 5,003,537 | 3/1991 | Sager | 371/1 X |
| 5,101,153 | 3/1992 | Morong | 371/27 X |
| 5,122,978 | 6/1992 | Merrill | 364/569 |
| 5,231,598 | 7/1993 | Vlahos | 364/569 |
| 5,259,006 | 11/1993 | Price et al. | 371/1 X |

Primary Examiner—Ellis B. Ramirez
Assistant Examiner—Thomas Peeso
Attorney, Agent, or Firm—Daniel H. Kane; Richard C. Calderwood; Vincenzo D. Pitruzzella

[57] ABSTRACT

An output skew detection circuit detects and measures output skew tOSLH, tOSHL between multiple in phase common edge output signals propagated through a multiple signal driver circuit having n outputs. The output skew detection circuit senses common edge output skew across the n in phase output signals simultaneously and directly. A first logic gate has n inputs coupled to the n outputs, detects occurrence of either the first or last of the multiple common edge output signals, and generates a first skew detection edge signal at a first logic gate output. The first and last common edge output signals are the signals propagated with minimum and maximum propagation times tplhmin, tphlmin and tplhmax, tphlmax. A second logic gate has n inputs coupled to the n outputs in parallel with the first logic gate. The second logic gate detects occurrence of the other of the first and last of the multiple common edge output signals and generates a second skew detection edge signal at a second logic gate output. The respective inputs of a third logic gate are coupled to the first and second logic gate outputs. The third logic gate generates a pulse signal having a pulse width or pulse duration determined by the first and second skew detection edge signals at the inputs of the third logic gate for providing a pulse width measure of the maximum output skew tOSLH, tOSHL between the first and last of the multiple common edge output signals. A pulse width detection circuit such as a flip flop coupled to the third logic gate delivers a threshold flag signal upon occurrence of a pulse signal having a pulse width greater than a specified pulse width threshold value corresponding to a maximum permitted output skew.

24 Claims, 11 Drawing Sheets

TTL OUTPUT BUFFER 18

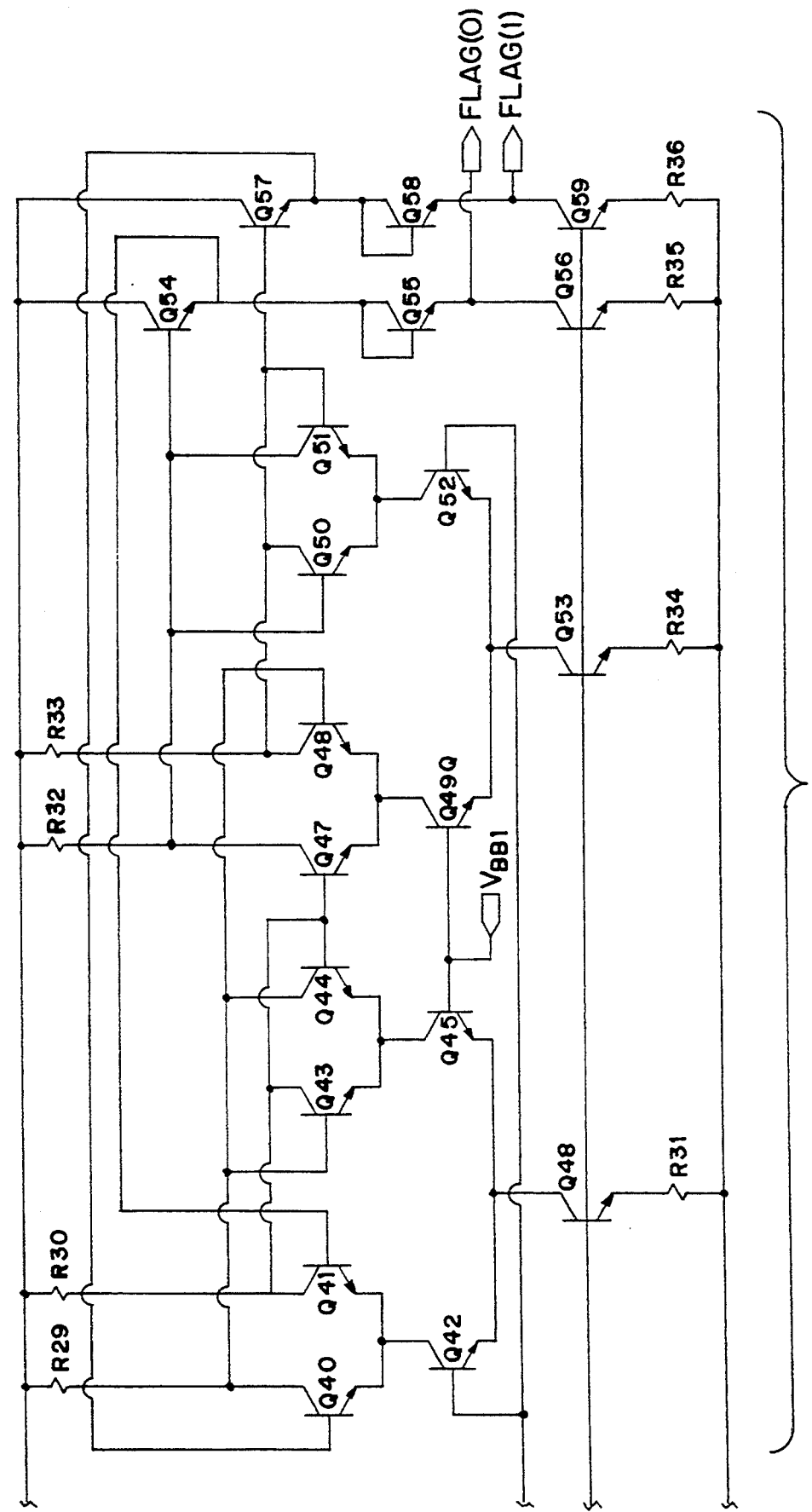

COMMON EDGE OUTPUT SKEW DETECTION CIRCUIT

TECHNICAL FIELD

This invention relates to a new output skew detection circuit for detecting and measuring output skew tOSLH, tOSHL between multiple in phase common edge output signals of an integrated circuit. The invention is applicable for skew testing multiple signal driver circuits such as clock driver circuits having n outputs. The invention measures common edge skew across any number of in phase signals at the n outputs of a high speed low skew IC device and permits simultaneous skew testing of all n outputs. It may be added to the device under test (DUT) loadboard of an IC device tester for skew testing at the time of comprehensive function testing of the DUT.

BACKGROUND ART

High speed microprocessor systems currently require TTL level clock signals running at frequencies on the order of 100 MHz. For proper operation at such high frequencies, low skew between in phase clock signals at various locations within the system is essential. High speed system design typically allocates less than 5% to 10% of the clock cycle to accommodate skew. Maximum common edge skew between in phase clock signals must therefore be limited to less than approximately 500 pS. Low skew or minimum skew clock driver circuits are designed to meet these demanding specifications. However a dilemma arises in attempting to achieve accurate production testing of such minimum skew devices. The low skew specifications exceed the measurement capabilities of most if not all current automatic test equipment.

A standard definition of the output skew parameter tOSLH for an IC clock driver circuit having a primary clock signal input and n (at least 2) secondary clock signal outputs is illustrated in FIG. 1. According to this definition, a single clock input signal provides a time zero reference $t_0$ for measuring propagation time tplh from the clock input signal at time $t_0$ to a specified point in the low to high (LH) transition at the selected output. For example, at TTL voltage levels the input switching threshold is typically at 1.5 v and propagation time and skew are measured at the 1.5 v voltage level. Propagation time and skew may be measured at other threshold points of the LH transition for other IC device families.

Because of circuit layout and package lead frame parasitic differences, a range of different propagation times tplh for the secondary clock signals at the n multiple outputs can be expected. The output skew parameter tOSLH is the maximum difference in propagation times tplh between the fastest and slowest outputs of the multiple output circuit. Referring to FIG. 1, if the propagation time for the output signal on output 1 is the smallest propagation time tplhmin, and the propagation time for the output signal on output 2 is the greatest propagation time tplhmax, then the maximum output skew parameter tOSLH for the device is defined as:

$$tOSLH = tplhmax - tplhmin.$$

Similarly the output skew parameter tOSHL for common edge high to low transitions HL is defined as:

$$tOSHL = tphlmax - tphlmin.$$

It is noted that the output skew parameters tOSLH and tOSHL represent the maximum timing skew or timing difference between the multiple common edge outputs themselves without any necessary reference to the time $t_0$ of the corresponding input signal edge.

An example of a conventional tester used for measuring output skew parameters tOSLH and tOSHL is the MCT tester, a microprocessor controlled digital IC device tester described for example in the *MCT 2000R TEST SYSTEMS HARDWARE MANUAL*, Publication No. 010193B, Revision B, Nov. 1, 1986, C 1986 MCT, Microcomponent Technology, Inc., 38 North Victoria Street, P.O. Box 64013, St. Paul, Minn. 55164 and also described in U.S. Pat. No. 5,101,153. A problem with such conventional testers is the limited bandwidth and limited resolution available for testing. As the speed of IC parts and devices has increased, equalling and exceeding the speed of the tester, large errors in testing measurement occur. For example, the tester pin electronics and precision measurement unit (PMU) have a certain limited rise time. As the rise time of the DUT part approaches the rise time of the tester, the result is increasing error in the rise time of output signals displayed on the screen. Skew testing for high speed low skew parts generally eludes such conventional testers.

Further discussion of testing output timing skew between multiple output signals is found in the Harry Vlahos U.S. patent application Ser. No. 769,940 filed Sep. 30, 1991 for DIRECT DIGITAL SYNTHESIS MEASUREMENT SIGNAL SKEW TESTER, now U.S. Pat. No. 5,231,598, issued Jul. 27, 1993.

To overcome the limitations of such a conventional tester, special "test heads" are required. Compensating software algorithms are encoded into the test program to estimate actual output skew. Alternatively, expensive new testers have been developed with higher resolution in an endeavor to match the speed of the DUT. For high speed minimum skew parts, output skew is also sometimes "guaranteed by design". That is, output skew is not tested in final production but is calculated and specified from data measured during the thorough device characterization and testing performed by the manufacturer. This approach may be necessitated by the hardware limitations of existing testers.

Another disadvantage of conventional testers is that output skew across all n outputs of a multiple output circuit cannot be measured directly and simultaneously. Rather, signal propagation times tplh and tphl are measured with reference to an input signal. Output skew is therefore a derivative parameter subject to the variables in measurement of separate propagation times through the part from input to multiple outputs. Or, the hardware limitations constrain comparative measurements at the output to skew measurements between two outputs at a time. In order to provide a complete test of output skew across n outputs, a series summation of separate measurements must be performed. For testing skew across 8 bits, for example 28 separate tests must be performed. For testing skew across 16 bits, 120 tests are required etc.

OBJECT OF THE INVENTION

It is therefore an object of the present invention to provide a new output skew detection circuit for detecting and measuring maximum output skew tOSLH, tOSHL between multiple in phase common edge output signals across any number of n outputs of a device simultaneously and directly.

Another object of the invention is to provide a common edge output skew detection circuit applicable for high speed low skew multiple signal driver circuits which overcomes the hardware resolution limitations of conventional testers.

A further object of the invention is to provide a relatively inexpensive common edge output skew detection circuit which may be added to the DUT loadboard of IC device testers for output skew testing of high speed low skew devices during the functional testing of the DUT.

DISCLOSURE OF THE INVENTION

In order to accomplish these results the invention provides an output skew detection circuit for detecting and measuring output skew tOSLH,tOSHL between multiple in phase common edge output signals propagated through a multiple signal driver circuit having n outputs. According to the invention a first logic gate having n inputs is coupled to the n outputs. The first logic gate is constructed for detecting occurrence of either one of the first and last of the multiple common edge output signals and generating a first skew detection edge signal at a first logic gate output. The first and last of the multiple common edge output signals are the output signals respectively propagated with minimum and maximum propagation times tplhmin, tplhmax and tphlmin, tphlmax.

The invention provides a second logic gate having n inputs coupled to the n outputs of the multiple signal driver circuit in parallel with the n inputs of the first logic gate. The second logic gate is constructed for detecting occurrence of the other of the first and last of the multiple common edge output signals and generating a second skew detection edge signal at a second logic gate output.

According to the invention respective inputs of a third logic gate are coupled to the first and second logic gate outputs for receiving the first and second skew detection edge signals. The third logic gate is constructed for generating a pulse signal defined by opposite going leading and trailing edges at an output of the third logic gate. The pulse signal has a pulse width or pulse duration determined by the first and second skew detection edge signals at the inputs of the third logic gate for providing a pulse width measure of the maximum output skew tOSLH,tOSHL between the first and last of the multiple common edge output signals.

In the preferred embodiment of the invention, the first logic gate is a disjunctive logic gate, the second logic gate is a conjunctive logic gate, and the third logic gate is a disjunctive logic gate. As used herein, a disjunctive logic gate is an OR,NOR,XOR or XNOR gate while a conjunctive logic gate is an AND or NAND gate. According to one example the first logic gate is a NOR gate, the second logic gate is an AND gate, and the third logic gate is an OR gate. According to an alternative example, the first logic gate is an OR gate, the second logic gate is an AND gate, and the third logic gate is an XOR gate.

The invention also provides a pulse width detector circuit having an input coupled to the output of the third logic gate to receive the pulse signal, and a pulse width detector circuit output providing an output signal according to the pulse width or pulse duration of the pulse signal. The pulse width detector circuit may be, for example a pulse width threshold detector circuit for detecting a pulse signal having a pulse width or pulse duration greater than a specified pulse width threshold value corresponding to a specified maximum permitted output skew value. The pulse width threshold detection circuit delivers a threshold flag signal upon occurrence of a pulse signal having a pulse width greater than the specified pulse width threshold value.

According to the preferred example, the output skew threshold detection circuit is a D type flip flop having a clock signal input coupled to the output of the third logic gate for receiving the pulse signal, and a flag signal output for generating a flag signal. The flip flop is constructed to switch and deliver a flag signal when the pulse signal pulse width exceeds the specified pulse width threshold value. The pulse width sensitivity of the flip flop circuit may be varied to set a selected pulse width threshold value. Alternative configurations for the flip flop circuit are described. Alternative embodiments of the output skew detection circuit at TTL and ECL voltage levels are also described.

More generally the invention provides a new method for detecting output skew tOSLH,tOSHL between multiple in phase common edge output signals propagated through a multiple signal driver circuit having n outputs. The method proceeds by detecting occurrence of the first of the multiple common edge output signals propagated with minimum propagation time tplhmin or tphlmin and generating a first skew detection edge signal; and detecting occurrence of the last of the multiple common edge output signals propagated with maximum propagation time tplhmax or tphlmax and generating a second skew detection edge signal. Further steps of the invention include generating a pulse signal and modulating the pulse width or pulse duration of the pulse signal according to the difference in propagation time between the first and last of the multiple common edge output signals, i.e., tplhmax—tplhmin or tphlmax—tphlmin. In other words the invention contemplates defining the pulse width or pulse duration of the pulse signal by the time difference between the first and second skew detection edge signals.

The process of detecting and measuring output skew is completed by sensing the pulse width or pulse duration of the pulse signal and generating a flag signal if the pulse width exceeds a specified threshold value corresponding to a maximum permitted output skew.

Other objects, features, and advantages of the invention are apparent in the following specification and accompanying drawing.

DESCRIPTION OF PREFERRED EXAMPLE EMBODIMENTS AND BEST MODE OF THE INVENTION

Figure 1:
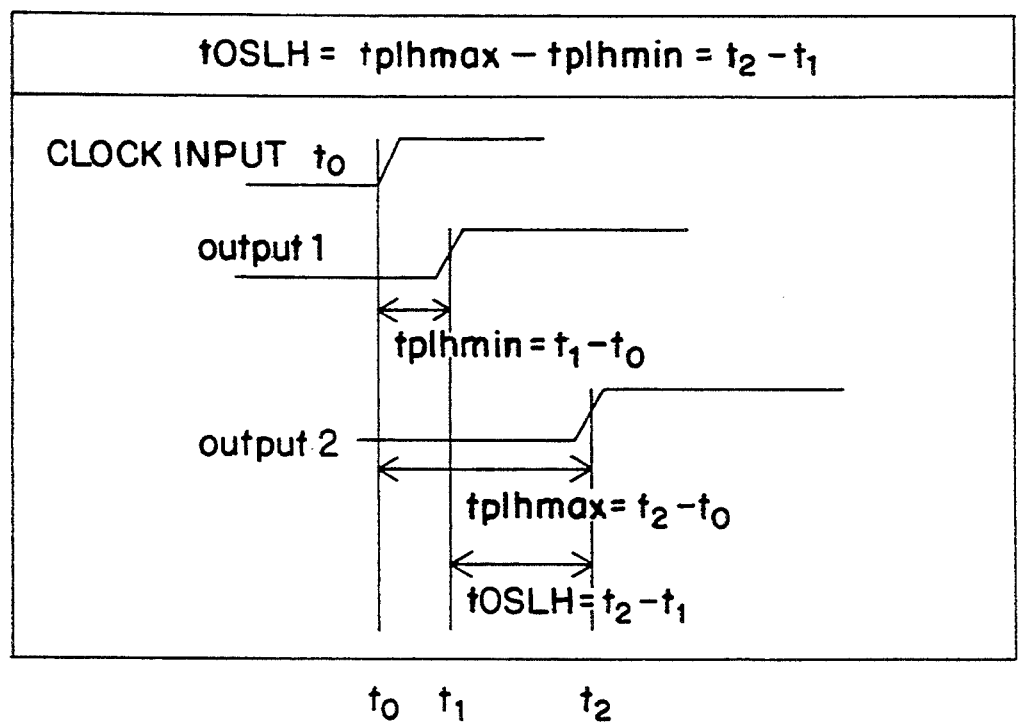
FIG. 1 is a timing diagram illustrating the conventional definition of the output skew parameter tOSLH for a single input multiple output driver circuit such as a clock driver circuit.
Figure 2:
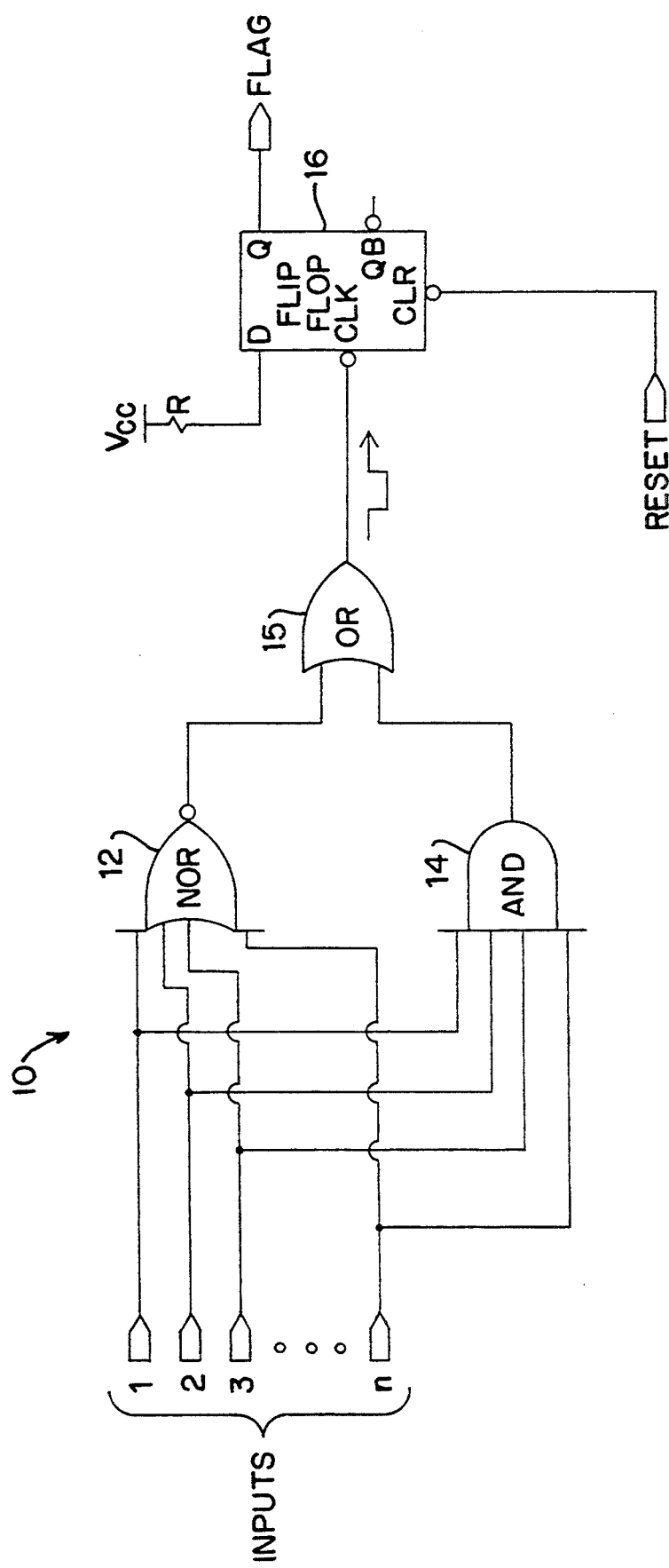
FIG. 2 is a schematic logic circuit diagram of a common edge output skew detection circuit according to the invention.

A common edge output skew detection circuit 10 according to the invention is illustrated in the logic circuit diagram of FIG. 2. The "n" outputs from a multiple signal driver circuit such as a high speed low skew clock driver circuit (not shown) provide the "n" parallel inputs to respective logic gates 12 and 14. NOR gate 12 and AND gate 14 provide "logical" detection of the first and last of the common edge in phase n input signals. These are the signals of the n input signals having minimum and maximum propagation times through the preceding multiple signal driver circuit. The time difference between the first and last of the group of n common edge in phase signals is the output skew parameter of interest.

In the case of common edge low to high transition (LH) signals, the n inputs are initially all at the logic low potential level L. The output of NOR gate 12 is high while the output of AND gate 14 is low. Therefore the output of the third logic gate, OR gate 15 is normally at the logic high potential level H for the steady state low condition at the n inputs. Upon an LH transition at the n outputs of the preceding multiple signal driver circuit, the common edge LH signals arrive at the n parallel inputs of the skew tester 10 with different propagation times according to the slight differences in the signal paths followed by the n common edge in phase LH signals.

The first logic gate, disjunctive NOR gate 12 detects the first to arrive LH signal with shortest propagation time tplhmin by a high to low HL transition at the NOR gate output. This signal is referred to herein as the first skew detection edge signal. The output of AND gate 14 remains low. With two low signals L at the inputs of the final OR gate 15, the output of the OR gate goes from high to low (HL) establishing the leading edge or first edge of a pulse signal to be generated by the OR gate 15. The first skew detection edge signal thus defines the leading edge or first edge of the skew detection pulse signal generated by the disjunctive third logic gate 15.

During arrival of intermediate LH signals of the n common edge in phase signals having intermediate propagation times tplhintermediate at the n inputs, the logic low conditions L at the outputs of the first and second logic gates 12 and 14 remain the same. The output of OR gate 15 remains at the logic low potential level also. The conjunctive AND gate 14 detects the last to arrive of the common edge LH signals having longest propagation time tplhmax by a low to high LH transition at the AND gate output. This signal is referred to herein as the second skew detection edge signal. With low L and high H signals at the inputs of OR gate 15, the output of OR gate 15 returns from low to high (LH) establishing the trailing edge or second edge of the pulse signal generated by OR gate 15. The second skew detection edge signal therefore defines the trailing edge or second edge and consequent pulse width or pulse duration of the skew detection pulse signal generated by the disjunctive third logic gate 15. This pulse signal for the logic circuit of FIG. 2 is a negative going pulse from a normally logic high potential level at the output of OR gate 15.

It is noted that the logic gates 12,14, and 15 permit sensing of common edge output skew across all n outputs of a multiple signal driver circuit simultaneously. The delays through the parallel n input wide first and second logic gates, NOR gate 12, and AND gate 14 are matched. While one gate senses the first to arrive signal with fastest propagation time tplhmin, the other detects the last to arrive signal with slowest propagation time tplhmax. These gates generate first and second skew detection edge signals. The third logic gate OR gate 15 generates a pulse signal with leading and trailing edges having a pulse width or pulse duration determined by the first and second skew detection edge signals. Importantly, output skew is sensed directly between the first and last of the n common edge in phase signals without intermediate calculations.

The pulse signal at the output of OR gate 15 is coupled to the clock input CLK of a negative edge triggered D type flip flop 16. The data input D is coupled to the high potential rail so that the true output or flag output FLAG is set high H if the pulse width or pulse duration of the pulse signal at CLK exceeds a pulse width threshold value corresponding to a maximum permitted output skew tOSLH between the first and last of the common edge n input signals at the n inputs of the skew detection circuit. As hereafter described with reference to the detailed circuit implementation of FIG. 3 and FIG. 3D, the pulse width sensitivity of the flip flop 16 may be varied to select the desired pulse width threshold value and maximum permitted output skew tOSLH, of for example 500 pS. As shown in the logic circuit of FIG. 2, the complementary output QB of flip flop 16 is not used. Alternatively the complementary output QB can be used for an output FLAG to provide a logic low potential level flag signal. A reset signal RESET is applied to the CLR input of flip flop 16 to return the FLAG output to a logic low potential level L for sensing the next switching event. In this example the RESET signal is a logic low potential level signal.

In the case of common edge high to low transition (HL) signals, the n inputs are initially all at the logic high potential level H. The output of NOR gate 12 is low while the output of AND gate 14 is high. Therefore the output of OR gate 15 is again normally at the logic high potential level H for the steady state logic high potential level condition at the n inputs. Upon an HL transition at the n outputs of the preceding multiple signal driver circuit (not shown), the common edge HL signals again arrive at the n parallel inputs of the skew tester with different propagation times caused by different characteristics of different signal paths.

In this case the second logic gate, conjunctive AND gate 14, detects the first to arrive HL signal with shortest propagation time tphlmin by a high to low HL transition at the output of AND gate 14. This signal is now the first skew detection edge signal. With two low signals L at the inputs of the final OR gate 15, the output of the OR gate goes from high to low (HL) establishing the leading edge or first edge of a the skew detection pulse signal to be generated by OR gate 15. Again, the first skew detection edge signal defines the leading edge or first edge of the skew detection pulse signal at the output of the disjunctive third logic gate 15.

The arrival of intermediate HL signals having intermediate propagation times tphlintermediate at the n inputs does not change the logic low conditions L at the outputs of the first and second logic gates 12 and 14. The output of OR gate 15 remains at the logic low condition also. The disjunctive NOR gate 12 detects the last to arrive of the common edge HL signals having longest propagation time tphlmax by a low to high LH transition at the NOR gate output. This signal is now the second skew detection edge signal. With high H and low L signals at the respective inputs of OR gate 15, the output of OR gate 15 returns from low to high (LH) establishing the trailing edge or second edge of the skew detection pulse signal generated by OR gate 15. The second skew detection edge signal again defines the trailing edge or second edge and therefore the pulse width of the skew detection pulse signal generated by the disjunctive third logic gate 15.

The pulse signal output from OR gate 15 is a negative going pulse signal coupled to the clock input CLK of negative edge triggered flip flop 16. The pulse signal at the clock input of flip flop 16 generates a high potential flag signal at the flip flop output FLAG if the pulse width exceeds the selected pulse width threshold value corresponding to maximum permitted output skew. If the pulse width is less than the pulse width threshold value then flip flop 16 does not switch. The flag output signal FLAG thus becomes a pass/fail indicator for common edge output skew magnitude. The operation of the logic circuit of FIG. 2 is summarized in the following TABLE I and TABLE II.

TABLE I

TRUTH TABLE FOR LOGIC CIRCUIT OF FIG. 2 DURING LH TRANSITION

|  | INPUTS STEADY STATE LOW | INPUTS LH at tplhmin | INPUTS LH at tplhintermediate | INPUTS LH at tplhmax |
|---|---|---|---|---|
| n INPUTS: 1 | L | L | L | H |
| 2 | L | L | H | H |
| 3 | L | L | H | H |
| 4 | L | H | H | H |
| 5 | L | L | L | H |
| 6 | L | L | L | H |
| 7 | L | L | H | H |
| . | | | | |
| . | | | | |
| . | | | | |
| n | L | L | L | H |
| NOR GATE 12 OUT | H | L | L | L |
| AND GATE 14 OUT | L | L | L | H |
| OR GATE 15 OUT | H | L | L | H |

TABLE II

TRUTH TABLE FOR LOGIC CIRCUIT OF FIG. 2 DURING HL TRANSITION

|  | INPUTS STEADY STATE HIGH | INPUTS HL at tphlmin | INPUTS HL at tphlintermediate | INPUTS HL at tphlmax |
|---|---|---|---|---|
| n INPUTS: 1 | H | H | H | L |
| 2 | H | H | L | L |
| 3 | H | H | L | L |
| 4 | H | L | L | L |
| 5 | H | H | H | L |
| 6 | H | H | H | L |
| 7 | H | H | L | L |
| . | | | | |
| . | | | | |
| . | | | | |
| n | H | H | H | L |
| NOR GATE 12 OUT | L | L | L | H |
| AND GATE 14 OUT | H | L | L | L |
| OR GATE 15 OUT | H | L | L | H |

A detailed circuit implementation of the logic circuit diagram of FIG. 2 is illustrated by a circuit with n=4 common edge in phase input signals in FIG. 3. An actual circuit implementation would typically have for example, 8 inputs or 16 inputs. The illustrated example is shown with 4 inputs to simplify the schematic circuit diagram and the same circuit configurations would apply and be multiplied or repeated for 8 inputs or more. FIG. 3 is a composite of the circuit portions illustrated in FIGS. 3A, 3B, and 3C. The circuit is constructed for inputs at TTL high and low potential levels. The initial logic gates, NOR gate 12 and AND gate 14 each are shown with four inputs. NOR gate 12 is provided by ECL differential transistors Q1–Q4,Q5 controlled by four inputs while AND gate 14 is provided by ECL differential transistor pair Q11,Q12 also controlled by the four inputs. The output of NOR gate ECL differential pair Q4,Q5 is coupled to differential transistor pair Q7,Q8 through output emitter follower transistor Q6. The output of NAND gate ECL differential pair Q11,Q12 is coupled to differential transistor pair Q14,Q15 through output emitter follower transistor Q13.

Figure 3A:
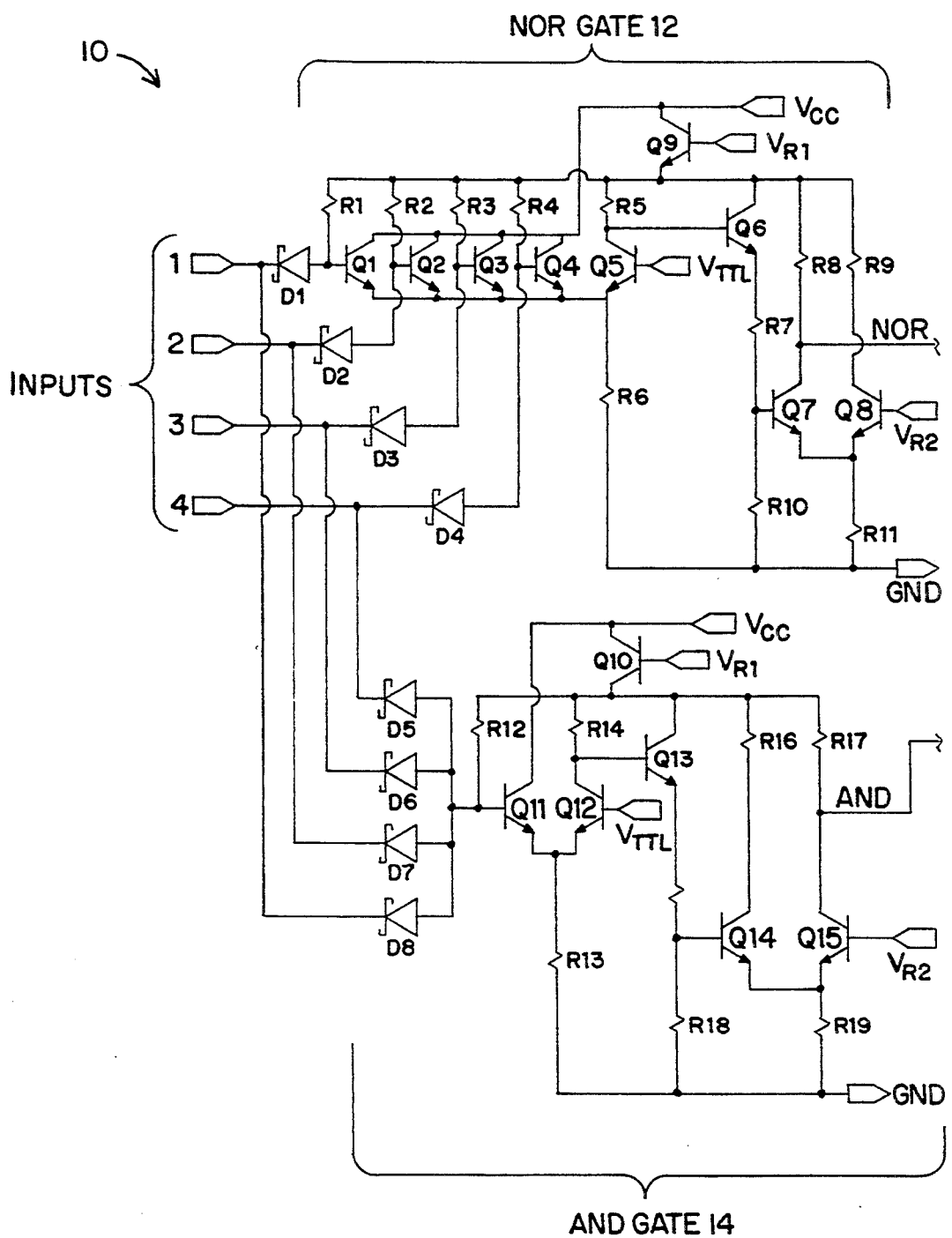
FIG. 3 is a composite of FIGS. 3A, 3B, & 3C and is a detailed schematic circuit diagram implementing the logic circuit of FIG. 2 with four (n=4) inputs at TTL voltage levels, TTL to positive rail ECL translation at the initial logic gates using ECL input gates, followed by ECL to TTL translation and TTL voltage level output signals
FIG. 3D is a fragmentary schematic circuit diagram of a digitally addressable resistor coupling network coupling the OR gate to the flip flop circuit for varying the pulse width sensitivity of the flip flop circuit of FIGS. 2 and 3.

As shown in FIG. 3A, TTL voltage level input signals at the four inputs 1–4 control the respective conducting states of alternative differential input transistors Q1,Q2,Q3 and Q4 of NOR gate 12. The differential input transistors Q1–Q4 are part of a differential ECL input gate with opposite reference transistor Q5. The TTL voltage level input signals are translated to positive rail ECL (PECL) voltage levels by reference transistor Q5. The reference voltage $V_{TTL}$ applied at the base of PECL input gate reference transistor Q5 is a TTL threshold voltage level such as, for example 1.5 v shifted up 1 diode voltage drop, i.e., shifted up 0.6 v, to compensate for the Schottky diode voltage drop across input diodes D1,D2,D3, and D4. As used in the specification and claims, the acronym ECL is intended to include both ECL and PECL.

The PECL input gate Q4,Q5 is a single ended output PECL gate. The single ended output from the collector node of translating reference transistor Q5 is coupled through emitter follower output transistor Q6 for controlling the conducting state of a second differential PECL gate Q7,Q8 of NOR gate 12. The logical NOR output signal is taken from the collector node of differential transistor Q7. The reference voltage $V_{R2}$ applied at the base of the reference transistor Q8 of the second PECL gate is set at a PECL threshold voltage of approximately 1 volt.

Similarly the TTL voltage level input signals at the four inputs 1-4 are coupled through input diodes D5,D6,D7 and D8 to control differential input transistor Q11 of PECL input gate Q11,Q12 of AND gate 14. The PECL input gate Q11,Q12 is also a single ended output PECL gate. The same reference voltage $V_{TTL}$ is applied at the base node of reference transistor Q12, and TTL to ECL voltage translation is accomplished by reference transistor Q12.

The output of the PECL input gate Q11,Q12 of AND gate 14 is taken from the collector node of reference transistor Q12 through emitter follower output transistor Q13 for controlling the second differential PECL gate Q14,Q15 of AND gate 14. The reference voltage $V_{R2}$ applied at the base node of reference transistor Q15 is also a PECL threshold voltage of approximately 1 volt. The differential transistor PECL gates of NOR gate 12 and AND gate 14 are coupled to the high potential power rail $V_{CC}$ through pseudorail transistors Q9 and Q10 respectively. The reference voltage $V_{R1}$ applied at the respective base nodes of pseudorail transistors Q9,Q10 are close to but less than the positive rail voltage $V_{CC}$ to prevent deep saturation of the NPN transistors operating in the differential PECL gates.

An important feature of the circuit implementation of FIG. 3A is that the NOR gate 12 and AND gate 14 are constructed with essentially identical pairs of PECL gates except of course that one pair is coupled to provide a disjunctive logic function while the other pair is coupled to provide a conjunctive logic function. The PECL logic configurations of NOR gate 12 and AND gate 14 assure that the signal delays through the respective parallel logic gates 12,14 are identical. The symmetry of the ECL gates assures symmetrical delays for either of the logic output signals NOR, AND from ECL gates Q7,Q8 and Q14,Q15.

Figure 3B:
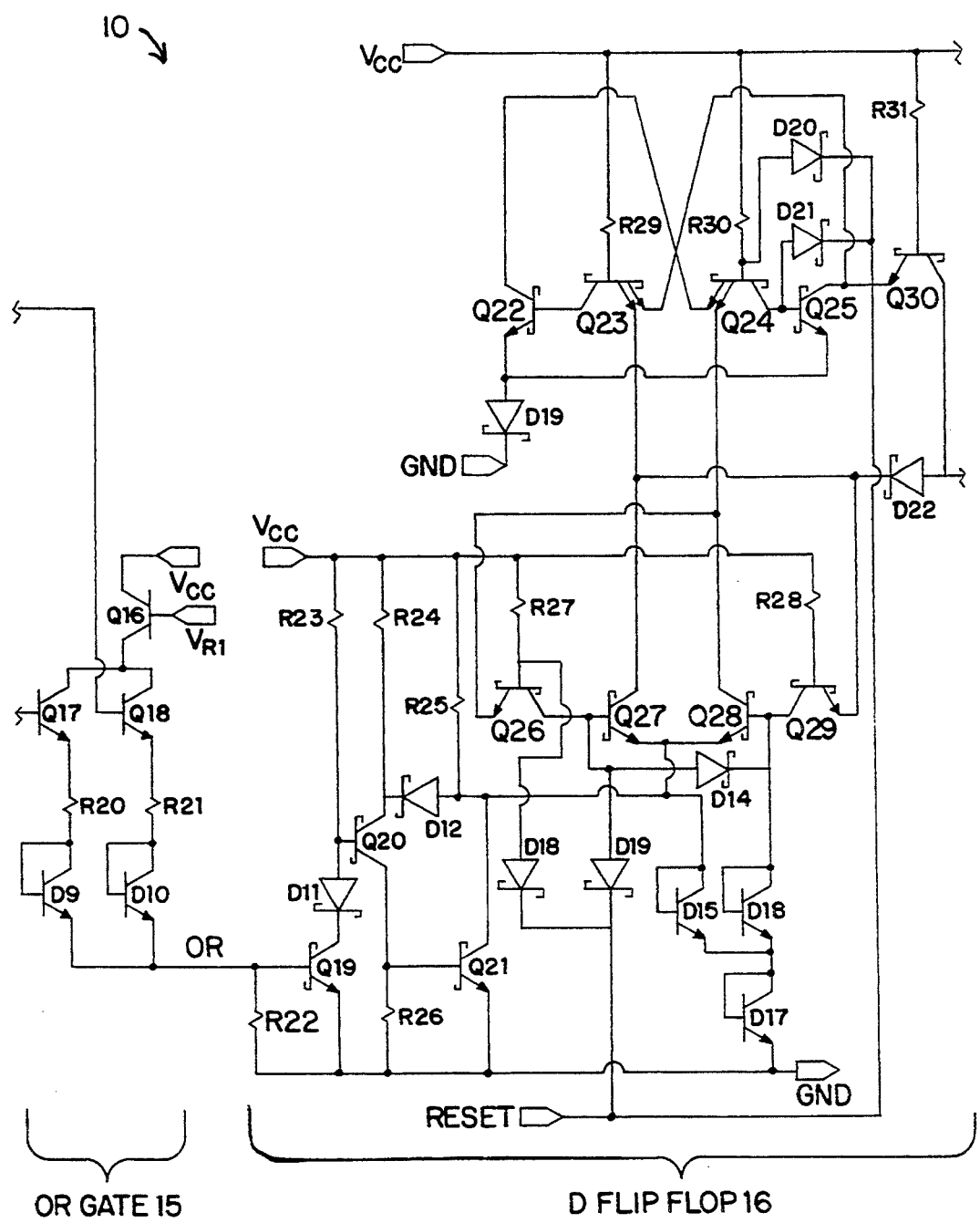
Figure 3C:
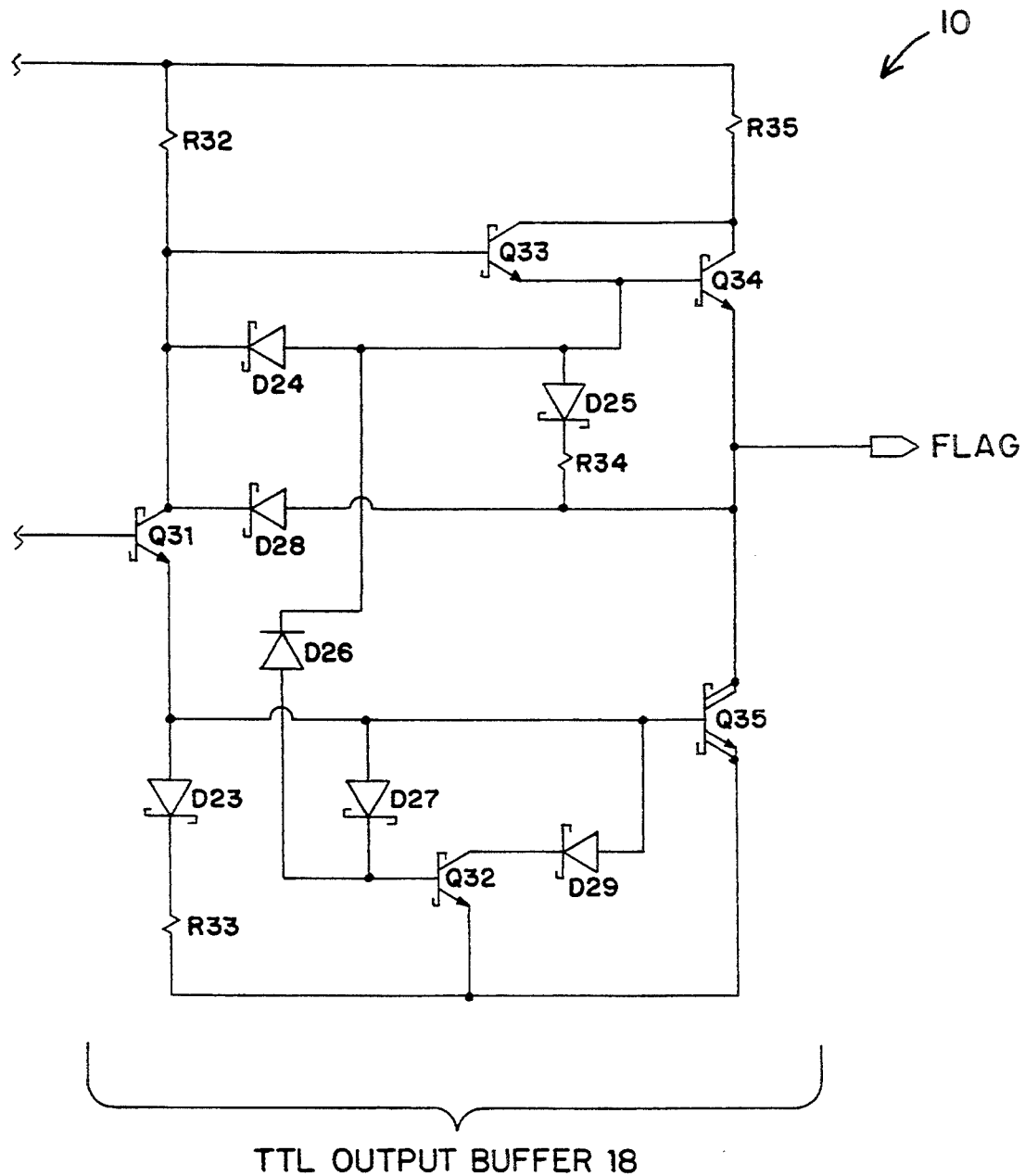

As shown in FIG. 3B, the logic output signals NOR, AND are applied at the inputs of OR gate 15. OR gate 15 provides a logical OR output signal at the clock signal input of D flip flop 16 as hereafter described. OR gate 15 also translates down the PECL threshold voltage levels of the NOR, AND signals so that a low potential level output signal OR at the output of OR gate 15 falls below 1 $V_{BE}$ above ground GND. Thus, when logic signals NOR, AND are both low, the output logic signal OR turns off the clock input transistor Q19 of flip flop 16. An OR high signal is clamped at 1 $V_{BE}$ above ground GND by the clock input transistor Q19 and the 1 $V_{BE}$ voltage drop is applied across resistor R22. The base current to clock input transistor Q19 is therefore set by either resistor R20 or R21 depending upon the AND,NOR signals to Q17,Q18 and the value of resistor R22. The value of resistor R22 is therefore a determinative component in setting the pulse width or pulse duration of low potential pulse signals at the base of clock input transistor Q19 as hereafter further described. It is also noted that transistor Q16 provides a pseudorail transistor to prevent deep saturation of the NPN transistors in OR gate 15.

Referring to the D type flip flop 16 illustrated in FIG. 3B, clock input transistor Q19 applies a clock signal through double inverting input transistors Q20,Q21 to the master latch circuit Q26,Q27,Q28,Q29. The master latch circuit is a standard cross coupled latch with master latch differential ECL gate transistors Q27,Q28 and feedback transistors Q26,Q29 coupled in a common base configuration. The data or D input to the master latch is located at the base of differential transistor Q27. The base nodes of differential pair transistors Q27,Q28 are referenced to ground through diode stacks with the base node of Q27 a diode voltage difference above the base node of Q28. This assures that Q27 turns on first when the emitters of Q27 and Q28 are at logic low potential so that the output flag signal FLAG is a high potential level signal as hereafter described.

A low potential level pulse signal of threshold pulse width or duration at the base of clock input transistor Q19, pulls down the voltage level at the collector node of input transistor Q21. Generally, the collector node of transistor Q21 is in phase with the logic OR signal. From a previous high condition of the clock input signal OR, and high condition at the collector node of Q21, master latch differential transistors Q27,Q28 are off. The clock input signal OR then switches low followed by the collector node of Q21, and transistor Q27 turns on first. Feedback transistor Q29 also turns on and prevents master latch differential transistor Q28 from turning on.

With Q27 conducting, slave latch differential transistor Q23 turns on holding off feedback transistor Q22 and the other slave latch differential transistor Q24. Slave latch feedback transistor Q25 is also conducting turning on the output coupling transistor Q30 which in turn pulls down the base node of the phase splitter transistor Q31 for TTL output buffer circuit 18 illustrated in FIG. 3C. Output coupling transistor Q30 at the output of flip flop 16 and TTL output buffer circuit 18 complete the return translation from ECL to TTL voltage levels. The TTL output buffer circuit 18 is an inverting output buffer and provides a high potential level flag FLAG output signal in response to the OR gate low potential level clock input signal of sufficient low potential level duration to exceed the threshold value of permitted skew.

The sensitivity of the skew detection circuit to low potential level clock input signal pulses of different low potential level duration is determined by three factors. First, the pulse width sensitivity of flip flop 16 is influenced by the sizing of the master latch transistors Q26,Q27,Q28 and Q29. Second it is determined by the values of the common base configuration transistors R27 and R28. Finally the input resistor R22 provides the greatest range of variability by effectively controlling the pulse width of the output signal OR from OR gate 15. Input resistor R22 provides the most practical determinant for adjusting the acceptable threshold value for pulse width or pulse duration and therefore output skew tOSLH and tOSHL. A suitable circuit arrangement for adjusting the pulse width sensitivity and threshold skew limit beyond which a high potential FLAG output is actuated is illustrated in FIG. 3D, hereafter described.

The TTL to ECL to TTL translating circuit configuration of the example of FIG. 3 facilitates matching of signal delays through the parallel logic gate inputs of the output skew detection circuit, while operating in a TTL environment. By translating the TTL voltage level input signals to ECL or PECL voltage levels, the parallel input logic gates can be implemented by ECL gates. The symmetry of ECL gates assures symmetrical delays on either side of the parallel logic gate inputs of the skew detector circuit. Skew detection signals can subsequently be returned to TTL voltage levels as illustrated in the example of FIG. 3. Another important step in matching delays is implementing the skew detection circuit on a single chip or die along with the combination of TTL to ECL translation and implementation by symmetrical ECL logic gates. Fabrication on a single die further assures matching of delays of comparative signals through the parallel input logic gates for high resolution output skew detection.

Figure 3D:
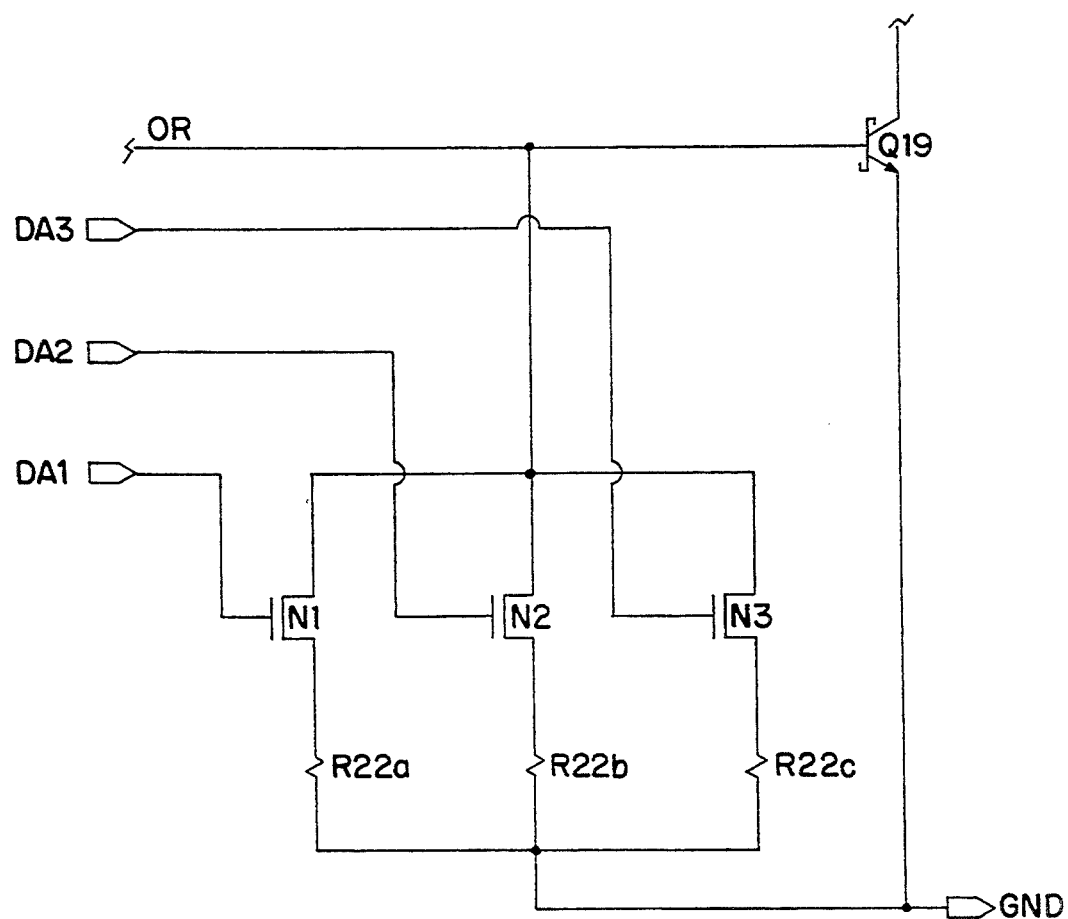

In order to vary the pulse width sensitivity of the D flip flop circuit 16, the coupling resistor R22 between OR gate 15 and flip flop 16 may be replaced with a digitally addressable resistor network as illustrated in FIG. 3D. According to the address signals DA1,DA2,-DA3, the effective resistance of coupling resistor R22 may be varied to adjust the pulse width threshold value at which flip flop 16 triggers a high potential flag signal at the output FLAG. At the same time this varies the maximum permitted output skew above which the high flag signal is triggered at the output FLAG. Eight binary combinations of resistance are provided by the circuit of FIG. 3D.

Figure 4:
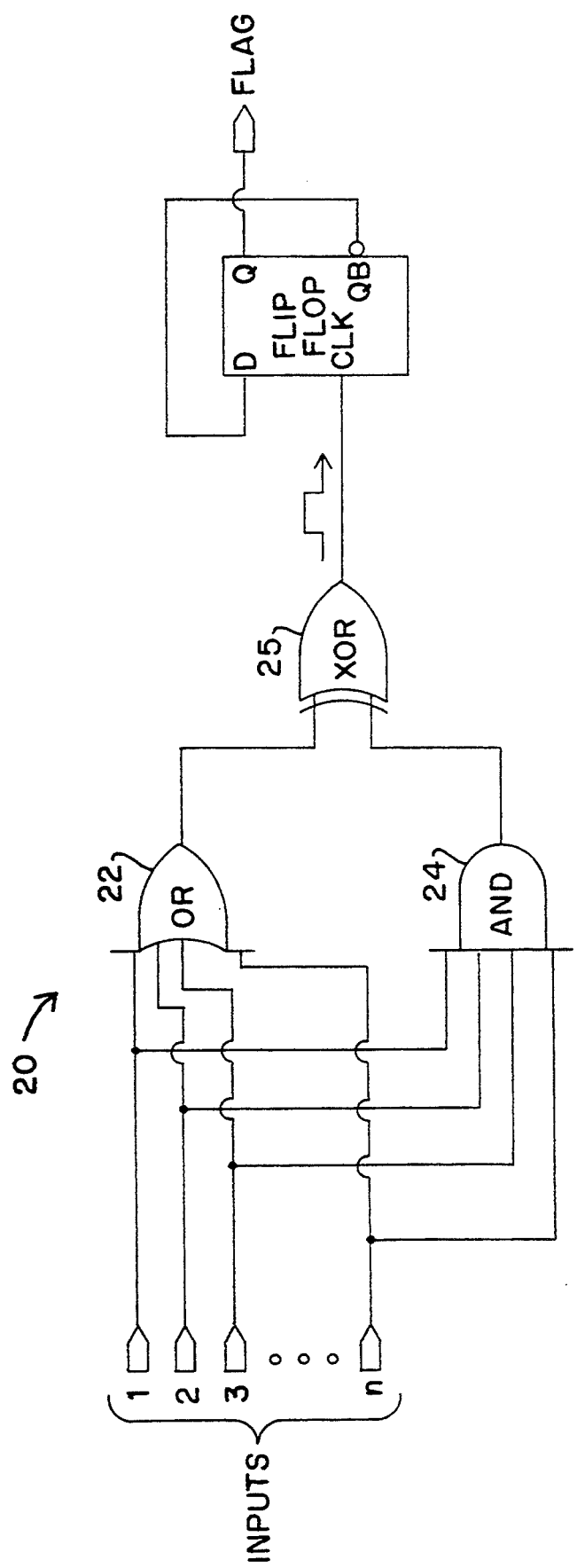
FIG. 4 is a schematic logic circuit diagram of an alternative embodiment of the common edge output skew detection circuit.

An alternative logic circuit configuration for the skew detection circuit is illustrated in FIG. 4. The n outputs from a multiple signal driver circuit (not shown) are coupled to provide the n parallel inputs to respective logic gates 22 and 24. OR gate 22 and AND gate 24 in this logic circuit configuration provide the "logical" detection of the first and last of the common edge in phase n input signals.

In the case of common edge low to high transition (LH) signals, the n inputs are initially at the logic low potential level L. The respective outputs of the first and second logic gates, distributive OR gate 22 and conjunctive AND gate 24 are both low. In this example the third logic gate is an exclusive or gate, XOR gate 25. With low potential level signals at both inputs, the output of XOR gate 25 is normally at the logic low potential level L for the steady state low condition at the n inputs. Upon an LH transition at the n outputs of the preceding multiple signal driver circuit (not shown), the common edge LH signals arrive at the n parallel inputs of skew detection circuit 20 with differing propagation times etc.

The first logic gate, disjunctive OR gate 22 detects the first to arrive LH signal with shortest propagation time tplhmin by a low to high LH transition at the OR gate output. This is the first skew detection edge signal. The output of AND gate 24 remains in the low condition. With high H and low L signals at the inputs of the final XOR gate 25, the output of XOR gate goes from low to high (LH) establishing the leading edge or first edge of the skew detection pulse signal to be generated by XOR gate 25.

Again, during arrival of intermediate LH signals of the n common edge in phase signals at intermediate propagation times tplhintermediate, the opposite logic high H and logic low L conditions at the outputs of the first and second logic gates 22 and 24 remain the same. The output of XOR gate 25 also remains at the logic high condition. The conjunctive AND gate 24 detects the last to arrive of the common edge LH signals having longest propagation time tplhmax by a low to high LH transition at the AND gate output. This is the second skew detection edge signal. The output of OR gate 22 remains high. With high signals H at both inputs of XOR gate 25, the output of XOR gate 25 returns from high to low (HL) establishing the trailing edge or second edge of the skew detection pulse signal generated by XOR gate 25. The pulse signal generated by XOR gate 25 is therefore a positive going pulse signal from a normally logic low potential level. The second skew detection edge signal defines the trailing edge or second edge and therefore the pulse width or pulse duration of the positive going skew detection pulse signal generated by XOR gate 25.

Logic gates 22,24, and 25 similarly permit sensing of common edge output skew across all n outputs of a multiple signal driver circuit simultaneously. The delays through the parallel n input wide first and second logic gates, OR gate 22 and AND gate 24 are similarly matched. Furthermore the maximum output skew is detected directly between the n inputs without intermediate computations.

The circuit configuration of pulse width detector flip flop circuit 26 illustrated in FIG. 4 is also slightly different from the circuit of FIG. 2. The skew detection pulse signal at the output of XOR gate 25 is coupled to the clock input CLK of a positive edge triggered D type flip flop 26. In this case the data input D is coupled to the complementary output QB of flip flop 26, toggling the flip flop after detecting a pulse signal having a pulse width greater than the pulse width threshold value that triggers flip flop 26. The true output Q provides the flag output FLAG which is set high H if a pulse signal with pulse width or pulse duration exceeding the pulse width threshold value is input to the clock signal input CLK. Upon occurrence of a high potential level flag signal FLAG, the complementary output QB coupled to the data input D toggles the flip flop in preparation for another switching event.

In the case of common edge high to low transition (HL) signals, the n inputs are initially all at the logic high potential level. The outputs of both OR gate 22 and AND gate 24 are high. The output of XOR gate 25 is again normally at the logic low potential level L for the steady state high condition at the n inputs. Upon an HL transition at the n outputs of the preceding multiple signal driver circuit (not shown), the common edge HL signals again arrive at the n parallel inputs of the skew tester of FIG. 4 with different propagation times.

In this case the second logic gate, conjunctive AND gate 24, detects the first to arrive HL signal with shortest propagation time tphlmin by a high to low HL transition at the output of AND gate 14. This is the first skew detection edge signal. With opposite high H and low L signals at the inputs of final XOR gate 25, the output of the XOR gate goes from low to high (LH) establishing the leading edge or first edge of the skew detection pulse signal to be generated by XOR gate 25.

The arrival of intermediate HL signals having intermediate propagation times tphlintermediate at the n inputs does not change the logic high and low conditions at the outputs of the first and second logic gates 22 and 24. The output of XOR gate 25 also remains at the logic high condition. The disjunctive OR gate 22 detects the last to arrive of the common edge HL signals having longest propagation time tphlmax by a high to low HL transition at the OR gate output. This signal is the second skew detection edge signal. With low potential level signals L at both of the inputs of XOR gate 25, the output of XOR gate 25 returns from high to low (HL) establishing the trailing edge or second edge of the skew detection pulse signal generated by XOR gate 25. The pulse signal is a positive going pulse signal with pulse width defined by the first and second skew detection edge signals and is also input to the clock input CLK of flip flop 26.

Figure 5A:
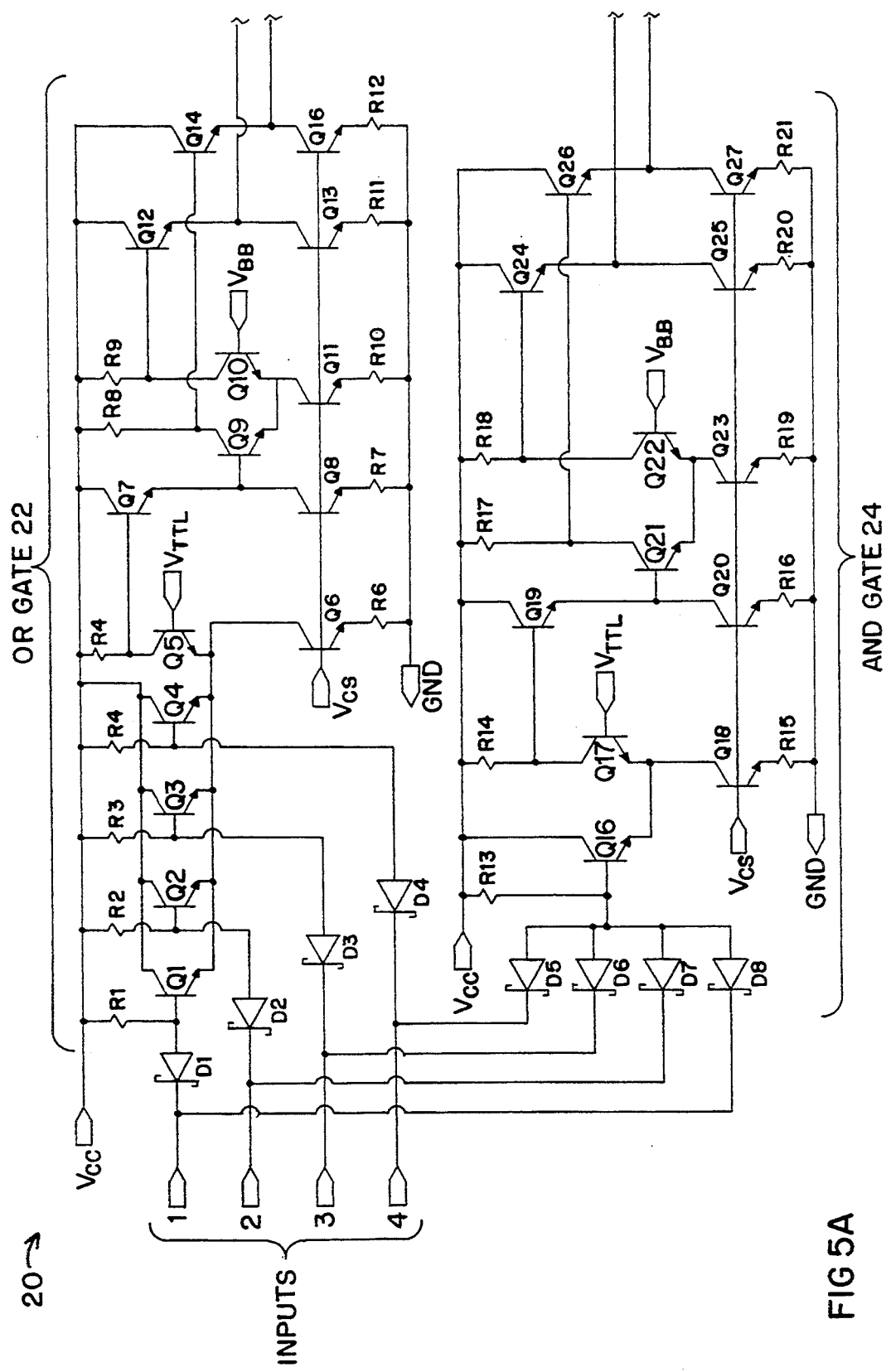
FIG. 5 is a composite of FIGS. 5A, 5B and 5C and is a detailed schematic circuit diagram implementing the logic circuit of FIG. 4 with four (n=4) inputs at TTL voltage levels, TTL to positive rail ECL translation using ECL logic input gates, and positive rail ECL voltage level signals and logic throughout the circuit.
FIG. 5D is a fragmentary schematic circuit diagram of digitally addressable swing resistor and tail resistor networks for varying the pulse width sensitivity of the XOR gate of FIG. 5.
Figure 5B:
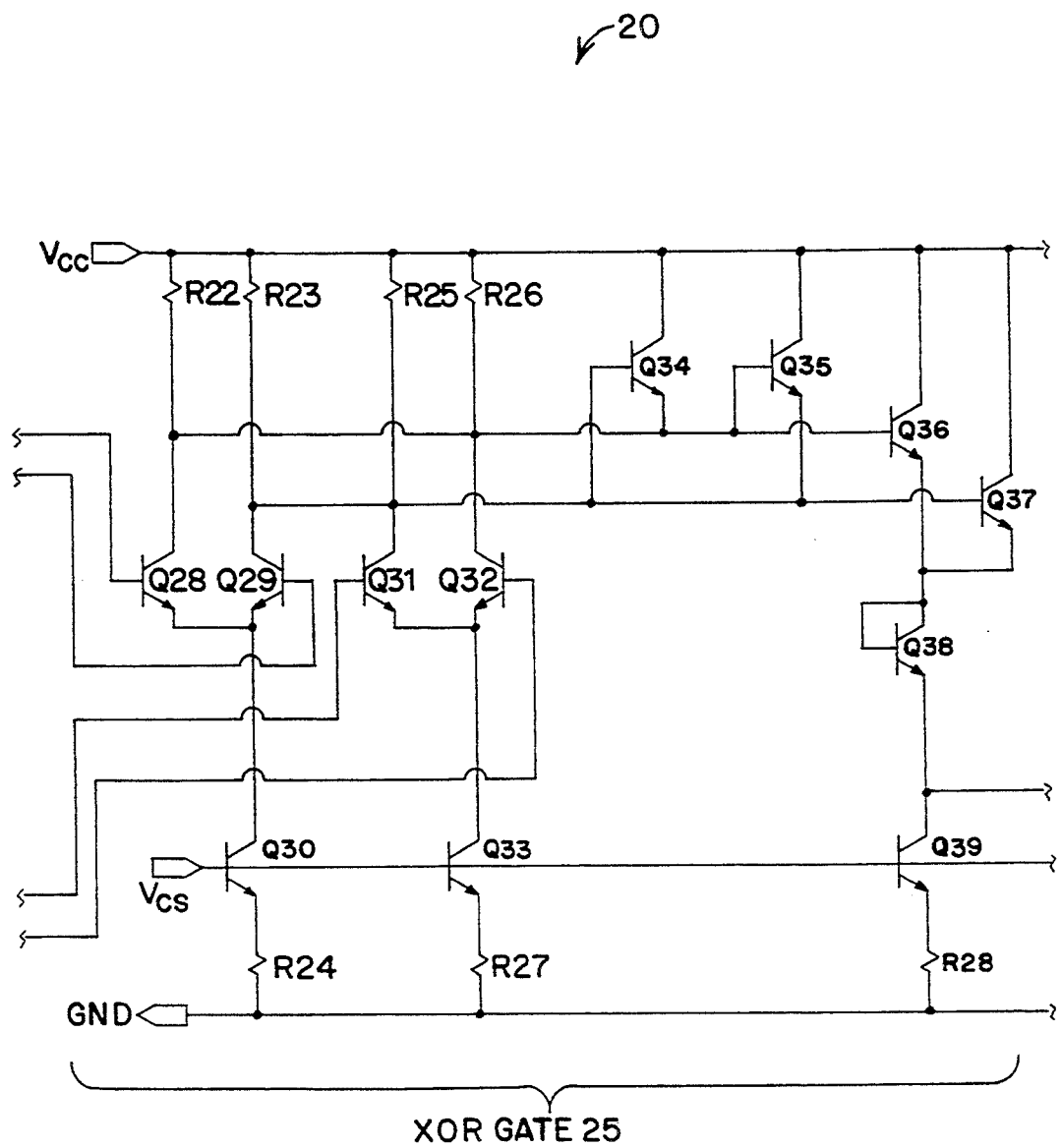

A detailed ECL circuit implementation of the logic circuit of FIG. 4 is illustrated in FIG. 5 which is a composite of the circuit portions shown in FIGS. 5A,5B and 5C. The circuit of FIG. 5 illustrates a circuit implementation with n=4 inputs again for simplicity although an actual circuit implementation would typically have eight or more inputs. The input signals are at TTL voltage levels which are translated to positive rail ECL voltage levels at the input gates. OR gate 22 is provided by differential transistor pair Q4,Q5 controlled by four inputs and having an output coupled through emitter follower output transistor Q7 to ECL differential transistor pair Q9,Q10. AND gate 24 is provided by differential transistor pair Q16,Q17 controlled by four inputs and having an output coupled through emitter follower output transistor Q19 to ECL differential transistor pair Q21,Q22. The remaining portions of the circuit operate at positive rail PECL voltage levels. The symmetry of the parallel PECL logic input gates again assures matching of signal delays through OR gate 22 and AND gate 24.

The outputs of OR gate 22 and AND gate 24 are coupled to the inputs of XOR gate 25 implemented by ECL gates Q28,Q29 and Q31,Q32 with two respective tail current sources through transistors Q30 and Q33 for matching switching speed and signal delays through the ECL gates. The output of XOR gate 25 is in turn coupled to the D flip flop 26 in the manner described with reference to FIG. 4. As shown in FIG. 5, alternative complementary flag outputs FLAG (0) and FLAG (1) are provided. Flip flop 26 indicates output skew in excess of the maximum permitted value by a change of state at the outputs FLAG. Alternatively, flip flop 26 can be wired in the same manner as flip flop 16 in FIGS. 2 and 3. The output of flip flop 26 may be coupled through an ECL to TTL translator and a TTL output buffer circuit as described with reference to FIG. 3.

Figure 5D:
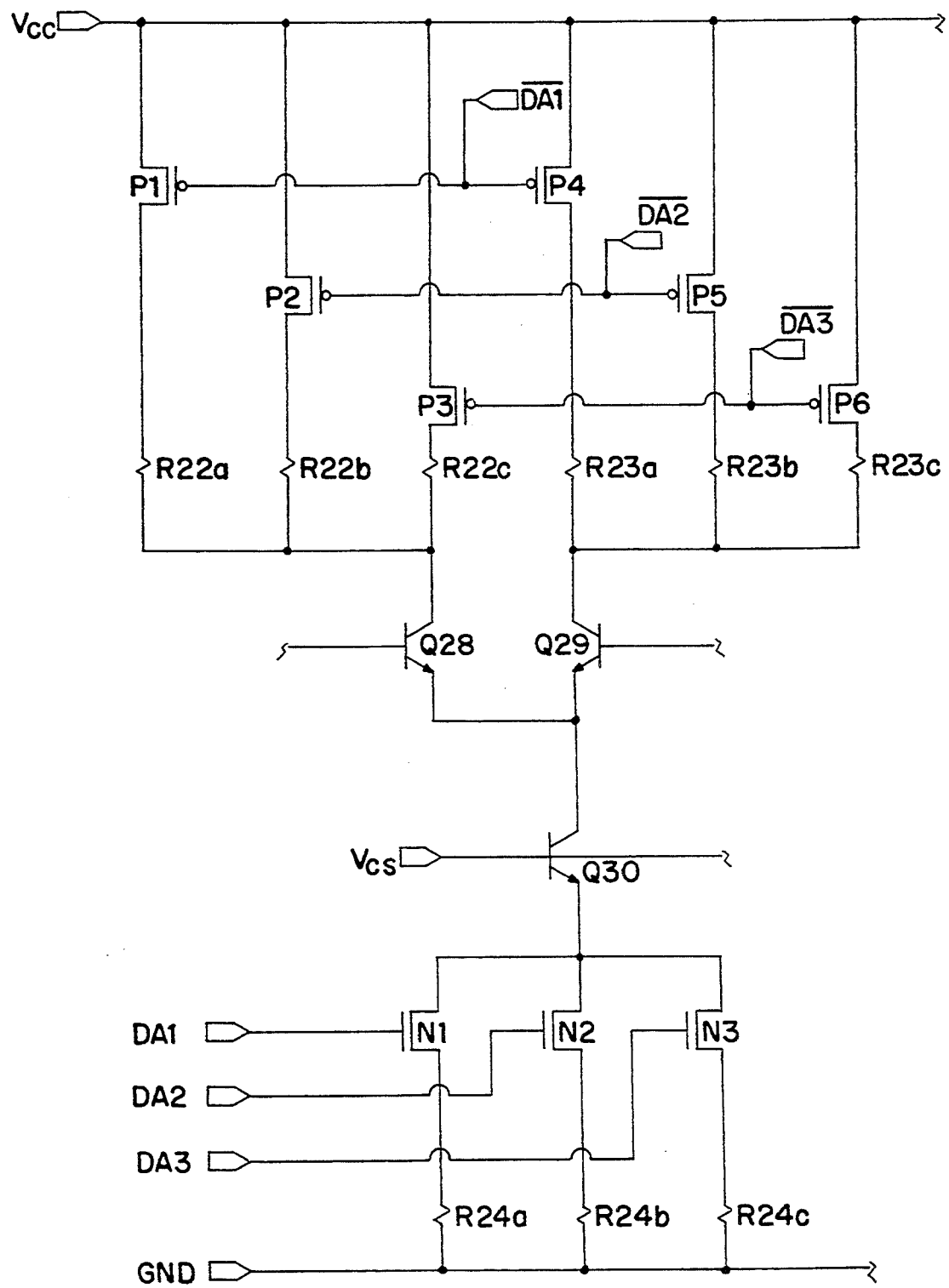

In order to vary the pulse width sensitivity of the skew detection circuit of FIG. 5, the swing resistors R22,R23 and R25,R26 and the respective tail resistors R24 and R27 of the XOR gate 25 differential transistor pairs may be replaced with digitally addressable swing resistor and tail resistor networks as shown in FIG. 5D. FIG. 5D illustrates an example digitally addressable swing resistor network and tail resistor network for differential transistor pair Q28,Q29 of XOR gate 25. The swing resistors R22,R23 and tail resistor R24 may be varied according to the digital addresses DA1,DA2,DA3 to vary the pulse width threshold value and therefore the maximum permitted output skew which actuates XOR gate 25 to trigger D flip flop 26.

Other variations in the logical configuration and implementation circuit couplings are also available in the circuits of FIGS. 2,3,4, and 5. For example, in the circuits of FIGS. 4 and 5, an XNOR gate can be used instead of XOR gate 25 with an output normally high and generating a negative going skew detection pulse signal. To convert from XOR gate 25 to an XNOR gate, it is necessary to switch the outputs of both OR gate 22 and AND gate 24 to the opposite differential transistor of the ECL differential transistor pair. Similarly in the circuit of FIGS. 2 and 3, a NOR gate could be used instead of OR gate 15 as the third logic gate with appropriate rearrangement of the output couplings of NOR gate 12 and AND gate 14. The example circuits according to the invention are easily expandable to test more common edge signals for any number of bits. The width of the disjunctive and conjunctive logic gates can be increased. Further, integral multiples of the four input circuits of FIGS. 3 & 5 can be combined by "ORing" the outputs together to test greater numbers of multiple signals. Inputs can also be tied together if fewer than four signals are to be tested.

Furthermore, the pulse width sensitivity of the respective circuits for detecting and measuring output skew may be varied and adjusted for example over a range from 150 pS to 500 pS for high speed low skew multiple signal driver circuits.

While the invention has been described with reference to particular example embodiments it is intended to cover all modifications and equivalents within the scope of the following claims.

I claim:

1. An output skew detection circuit for detecting and measuring output skew (tOSLH, tOSHL) between the first and last of n multiple in phase common edge output signals propagated through a multiple signal driver circuit having n outputs comprising:
   a first logic gate having n inputs coupled to said n outputs, said first logic gate constructed for detecting occurrence of one of the first and last of the multiple common edge output signals respectively propagated with minimum and maximum propagation times (tplhmin tphlmin, tplhmax tphlmax), and generating a first skew detection edge signal at a first logic gate output;
   a second logic gate having n inputs coupled to said n outputs in parallel with the n inputs of the first logic gate, said second logic gate constructed for detecting occurrence of the other of the first and last of the multiple common edge output signals and generating a second skew detection edge signal at a second logic gate output;
   and a third logic gate having respective inputs coupled to the first and second logic gate outputs for receiving the first and second skew detection edge signals, said third logic gate constructed for generating a pulse signal defined by opposite going leading and trailing edges at an output of the third logic gate, said pulse signal having a pulse width or pulse duration determined by the first and second skew detection edge signals at the inputs of the third logic gate for providing a pulse width measure of the maximum output skew (tOSLH, tOSHL) between the first and last of the multiple common edge output signals.

2. The output skew detection circuit of claim 1 wherein the first logic gate is a disjunctive logic gate, the second logic gate is a conjunctive logic gate, and the third logic gate is a disjunctive logic gate.

3. The output skew detection circuit of claim 2 wherein the first logic gate is a NOR gate, the second logic gate is an AND gate, and the third logic gate is an OR gate.

4. The output skew detection circuit of claim 2 wherein the first logic gate is an OR gate, the second logic gate is an AND gate, and the third logic gate is an XOR gate.

5. The output skew detection circuit of claim 1 comprising a pulse width detector circuit having an input coupled to the output of the third logic gate to receive the pulse signal, and a pulse width detector circuit output providing an output signal according to the pulse width or pulse duration of said pulse signal.

6. The output skew detection circuit of claim 5 wherein the pulse width detector circuit comprises a pulse width threshold detector circuit for detecting a pulse signal having a pulse width or pulse duration greater than a specified pulse width threshold value corresponding to a specified maximum permitted output skew value, said pulse width threshold detection circuit having a threshold output for delivering a threshold flag signal upon occurrence of a pulse signal having a pulse width greater than said specified pulse width threshold value.

7. The output skew detection circuit of claim 6 wherein the pulse width threshold detector circuit comprises a D type flip flop having a clock signal input (CLK) coupled to the output of the third logic gate for receiving said pulse signal and a flag signal output (Q) for generating a flag signal, said flip flop constructed to switch and deliver a flag signal when the pulse signal pulse width exceeds said specified pulse width threshold value.

8. The output skew detection circuit of claim 7 wherein the flip flop comprises a data input (D) coupled to a power rail ($V_{CC}$) and a reset input (CLR) for resetting the flip flop after detecting a pulse signal pulse width exceeding the specified pulse width threshold value.

9. The output skew detection circuit of claim 7 wherein the flip flop comprises a data input (D) and a complementary output (QB) coupled to the data input (D) for toggling the flip flop after detecting a pulse signal pulse width exceeding the specified pulse width threshold value.

10. The output skew detection circuit of claim 3 wherein the NOR gate is constructed from ECL gates and wherein the AND gate is constructed from ECL gates to equalize signal delays through the respective gates.

11. The output skew detection circuit of claim 10 comprising a pulse width detection circuit coupled to the output of the third gate, and wherein said pulse width detection circuit comprises a D type flip flop having a clock signal input (CLK) coupled to the third logic gate output to receive the pulse signal, a data signal input (D) coupled to a power rail ($V_{CC}$), a flag output (Q) for delivering a flag signal, said flip flop being constructed to switch and deliver a flag signal upon occurrence of a pulse signal having a pulse width or pulse duration in excess of a specified threshold value corresponding to a maximum permitted output skew, a TTL output buffer circuit coupled to the flip flop flag output, and a reset input (CLR) for resetting the flip flop after detection of a pulse signal pulse width greater than the pulse width threshold value.

12. The output skew detection circuit of claim 4 wherein the OR gate, AND gate, and XOR gate comprise ECL gates.

13. The output skew detection circuit of claim 12 comprising a pulse signal pulse width detector circuit coupled to the third gate output, said pulse width detector circuit comprising a D type flip flop having a clock signal input (CLK) coupled to the third logic gate output to receive the pulse signal, a data signal input (D), a complementary output (QB) coupled to the data signal input (D), and a flag signal output (Q), said flip flop being constructed for switching and providing a flag signal when the pulse signal pulse width exceeds a threshold value corresponding to a maximum permitted output skew.

14. The output skew detection circuit of claim 12 wherein the XOR gate comprises first and second ECL input gates constructed with separate first and second tail current generators for matched switching speed.

15. The output skew detection circuit of claim 7 comprising a digitally addressable resistor network having selectable resistance values coupling the third logic gate to the flip flop, said resistance values being selectable to vary the pulse width sensitivity of the skew detection circuit and the specified pulse width threshold value that switches the flip flop for delivering a flag signal.

16. The output skew detection circuit of claim 12 wherein the XOR gate comprises an ECL gate having a digitally addressable swing resistor network having selectable swing resistance values and a digitally addressable tail resistor network having selectable tail resistance values, said swing resistance values and tail resistance values being selectable for varying the pulse width sensitivity of the XOR gate and the selected pulse width threshold value.

17. An output skew detection circuit for detecting and measuring output skew (tOSLH, tOSHL) between the first and last of n multiple in phase common edge output signals propagated through a multiple signal driver circuit having n outputs comprising:
 a disjunctive first logic gate having n inputs coupled to said n outputs, said first logic gate constructed for detecting occurrence of one of the first and last of the multiple common edge output signals respectively propagated with minimum and maximum propagation times (tplhmin tphlmin, tplhmax tphlmax), and generating a first skew detection edge signal at a first logic gate output;
 a conjunctive second logic gate having n inputs coupled to said n outputs in parallel with the n inputs of the first logic gate, said second logic gate constructed for detecting occurrence of the other of the first and last of the multiple common edge output signals and generating a second skew detection edge signal at a second logic gate output;
 a disjunctive third logic gate having respective inputs coupled to the first and second logic gate outputs for receiving the first and second skew detection edge signals, said third logic gate constructed for generating a pulse signal defined by opposite going leading and trailing edges at an output of the third logic gate, said pulse signal having a pulse width or pulse duration determined by the first and second skew detection edge signals at the inputs of the third logic gate for providing a pulse width measure of the maximum output skew (tOSLH, tOSHL) between the first and last of the multiple common edge output signals;
 and a pulse width threshold detector circuit comprising a D type flip flop having a clock signal input (CLK) coupled to the output of the third logic gate for receiving said pulse signal and a flag signal output (Q) for generating a flag signal, said flip flop constructed to switch and deliver a flag signal when the pulse signal pulse width exceeds a specified pulse width threshold value corresponding to a maximum permitted output skew value.

18. A method for detecting output skew (tOSLH, tOSHL) between the first and last of n multiple in phase common edge output signals propagated through a multiple signal driver circuit having n outputs comprising:

detecting occurrence of the first of the multiple common edge output signals propagated with minimum propagation time (tplhmin, tphlmin) by coupling the n outputs of the multiple signal driver circuit to n inputs of a disjunctive first logic gate and generating a first skew detection edge signal at the output of the disjunctive first logic gate corresponding to the first of the multiple common edge output signals;

detecting occurrence of the last of the multiple common edge output signals propagated with maximum propagation time (tplhmax, tphlmax) by coupling the n outputs of the multiple signal driver circuit to n inputs of a conjunctive second logic gate and generating a second skew detection edge signal at the output of the conjunctive second logic gate corresponding to the last of the multiple common edge output signals;

and generating a pulse signal and defining the pulse width or pulse duration of said pulse signal by the time difference between the first and second skew detection edge signals by coupling the outputs of the first and second logic gates to the inputs of a disjunctive third logic gate and generating said pulse signal at the output of said third logic gate.

19. The method of claim 18 comprising the step of detecting and measuring output skew (tOSLH, tOSHL) by sensing the pulse width or pulse duration of said pulse signal.

20. The method of claim 19 comprising the step of sensing the pulse width or pulse duration of the pulse signal and generating a flag signal if the pulse width exceeds a specified pulse width threshold value corresponding to a maximum permitted output skew.

21. A method of detecting and measuring output skew (tOSLH, tOSHL) between the first and last of n multiple in phase common edge output signals propagated through a multiple signal driver circuit having n outputs comprising:

detecting occurrence of the first of the multiple common edge output signals propagated with minimum propagation time (tplhmin, tphlmin) by coupling the n outputs of the multiple signal driving circuit to n inputs of a first logic gate and detecting said occurrence at the output of the first logic gate;

detecting occurrence of the last of the multiple common edge output signals propagated with maximum propagation time (tplhmax,tphlmax) by coupling the n outputs of the multiple signal driver circuit to n inputs of a second logic gate and detecting said occurrence at the output of the second logic gate;

generating a pulse signal by coupling the outputs of the first and second logic gates to the inputs of a third logic gate and generating said pulse signal at the output of said third logic gate;

and modulating the pulse width or pulse duration of the pulse signal at the output of the third logic gate according to the difference in propagation time between the first and last of the multiple common edge output signals (tplhmax−tplhmin, tphlmax−tphlmin).

22. The method of claim 21 comprising the step of sensing the pulse width or pulse duration of the pulse signal and generating a flag signal if the pulse width exceeds a specified pulse width threshold value corresponding to a maximum permitted output skew.

23. The method of claim 22 comprising the step of using a pulse width detection circuit for sensing the pulse width of the pulse signal and generating a flag signal if the pulse width or pulse duration exceeds a specified pulse width threshold value, and varying the pulse width sensitivity of the pulse width detection circuit for varying the specified pulse width threshold value.

24. The method of claim 22 comprising the step of varying the pulse width sensitivity of said third logic gate for varying the specified pulse width threshold value.

* * * * *